(12) United States Patent
Masuch

(10) Patent No.: US 12,742,639 B2
(45) Date of Patent: Sep. 22, 2026

(54) METHOD FOR CHECKING A BATTERY ELEMENT STACK WITH REGARD TO THE POSITION OF BATTERY ELEMENT LAYERS

(71) Applicant: Volkswagen Aktiengesellschaft, Wolfsburg (DE)

(72) Inventor: Steffen Masuch, Braunschweig (DE)

(73) Assignee: PowerCo SE, Salzgitter (DE)

( * ) Notice: Subject to any disclaimer, the term of this patent is extended or adjusted under 35 U.S.C. 154(b) by 209 days.

(21) Appl. No.: 18/612,970

(22) Filed: Mar. 21, 2024

(65) Prior Publication Data

US 2024/0318955 A1 Sep. 26, 2024

(30) Foreign Application Priority Data

Mar. 21, 2023 (DE) ..................... 10 2023 202 492.6

(51) Int. Cl.
*G06T 7/00* (2017.01)
*G01B 15/00* (2006.01)
(Continued)

(52) U.S. Cl.
CPC ............ *G01B 15/00* (2013.01); *G06T 7/0006* (2013.01); *G06T 7/13* (2017.01); *H01M 10/04* (2013.01);
(Continued)

(58) Field of Classification Search
CPC .. H01M 10/04; H01M 10/0585; H01M 50/46; G01B 15/00
See application file for complete search history.

(56) References Cited

U.S. PATENT DOCUMENTS 11,547,453 B2 1/2023 Lengyel et al.
12,201,328 B2 1/2025 Lengyel et al.
(Continued)

FOREIGN PATENT DOCUMENTS

DE 102021117152 A1 1/2023
EP 3826090 A1 5/2021
(Continued)

OTHER PUBLICATIONS

Office Action for Canadian Patent Application No. 3,232,822 dated Jan. 26, 2026.

(Continued)

*Primary Examiner* — Dani Fox
(74) *Attorney, Agent, or Firm* — Muncy, Geissler, Olds & Lowe, P.C.

(57) ABSTRACT

A method for checking a stack of multiple battery element layers in the form of anodes, cathodes, and separators. Geometries of at least one of the large surfaces of at least the anodes and/or the cathodes are determined. The battery element layers are stacked to form the stack. Subsequently for a position check of the anodes and/or of the cathodes, the stack is irradiated by X-ray radiation), wherein the X-ray radiation is oriented perpendicularly with respect to the large surfaces of the battery element layers, and via the detected X-ray radiation, with regard to at least one pair of opposite sides of the stack the greatest edge spacing that is present between the edges of the considered type of electrode (anodes or cathodes) of this pair is determined.

16 Claims, 7 Drawing Sheets

(51) Int. Cl.
*G06T 7/13* (2017.01)
*H01M 10/04* (2006.01)

(52) U.S. Cl.
CPC ............... *G06T 2207/10116* (2013.01); *G06T 2207/30164* (2013.01)

(56) References Cited

U.S. PATENT DOCUMENTS

| | | | | |
|---|---|---|---|---|
| 2022/0216501 | A1 | 7/2022 | Oh et al. | |
| 2023/0003670 | A1 | 1/2023 | Kraken et al. | |
| 2025/0189465 | A1* | 6/2025 | Kim | G06T 7/13 |

FOREIGN PATENT DOCUMENTS

| | | | |
|---|---|---|---|
| EP | 3893777 | B1 | 2/2025 |
| EP | 4523641 | A2 | 3/2025 |
| EP | 4523641 | A3 | 6/2025 |
| JP | 2013224846 | A | 10/2013 |
| JP | 2014225373 | A | 12/2014 |
| JP | 2020188004 | A | 11/2020 |
| WO | WO2016114257 | A1 | 7/2016 |
| WO | WO 2020123857 | A1 | 6/2020 |
| WO | WO2023167558 | A1 | 9/2023 |

OTHER PUBLICATIONS

Chinese Offcie Action for Chinese Patent Application 2024043395 mailed on May 23, 2025.

* cited by examiner

METHOD FOR CHECKING A BATTERY ELEMENT STACK WITH REGARD TO THE POSITION OF BATTERY ELEMENT LAYERS

This nonprovisional application claims priority under 35 U.S.C. § 119(a) to German Patent Application No. 10 2023 202 492.6, which was filed in Germany on Mar. 21, 2023 and which is herein incorporated by reference.

BACKGROUND OF THE INVENTION

Field of the Invention

The invention relates to a method for checking a stack of multiple battery element layers in the form of anodes, cathodes, and separators. Such a stack, also referred to as an electrode-separator composite (ESC), may be provided in particular as an integral part of a battery.

Description of the Background Art

In the automated manufacture of batteries, battery element layers are stacked to form stacks, using stacking machines (see US 2022/0216501 A1), wherein the placement accuracy of the battery element layers and in particular of the electrodes is the quality criterion for the process capability of the stacking machines. All edges of the polygonal and in particular rectangular battery element layers must have a defined distance from one another and must be within a defined tolerance range, so that on the one hand the optimal electrochemical performance of the batteries is ensured, and on the other hand, a short circuit between neighboring electrodes due to insufficiently precise stacking is avoided. Such a short circuit could result in failure of the battery in question.

It may be provided to dimension the separator of a stack to be larger than the anode, and the anode in turn to be larger than the cathode, in such a way that over the entire extent an overhang of 1 millimeter, for example, results between the separator and the anode on the one hand and the anode and the cathode on the other hand, in order to reliably avoid a short circuit between neighboring electrodes due to insufficiently precise stacking, taking into account the placement accuracy of stacking machines being used at the time. Via such an overhang, it is also possible to avoid reduced chemical performance of the stacks due to imprecise positioning of the electrodes. However, such tolerance-related overdimensioning of the anodes and separators increases the material consumption in manufacturing the stacks, and therefore increases the costs, the space requirements, and the weight of the stacks and thus of the batteries. It may therefore be meaningful to minimize such tolerance-related overdimensioning of battery element layers in stacks. For this purpose, to avoid a short circuit between neighboring electrodes due to insufficiently precise stacking, the placement accuracy of the stacking machines used for the stacking should be increased and/or the quality assurance within the scope of manufacturing the stacks should be improved, so that manufacture of short-circuited stacks is avoided with sufficient reliability, or within the scope of the manufacture these stacks may be reliably sorted out.

WO 2016/114257 A1 discloses a method for checking an ESC using X-ray radiation.

SUMMARY OF THE INVENTION

It is therefore an object of the invention to provide a method for determining the placement accuracy of battery element layers of a battery element stack, which with sufficient accuracy can be carried out in the easiest and/or quickest manner possible.

According to an example of the invention, a method for checking at least one stack of multiple battery element layers in the form of anodes as a first type of electrode, cathodes as a second type of electrode, and separators (which separate and electrically insulate the anodes and the cathodes), wherein the battery element layers have large polygonal and preferably rectangular surfaces. The large surfaces of the battery element layers may have, at least in part, different sizes. The battery element layers are stacked in a stacking direction that is oriented perpendicularly with respect to the large surfaces. The electrodes of a battery element may differ at least with regard to a contained active material, as a result of which the electrodes designed as anodes have an anodic effect, and the electrodes designed as cathodes have a cathodic effect (in each case with regard to discharge of the battery cell).

The battery element layers may preferably have a plate-shaped design. "Plate-shaped" can be understood to mean a body or a portion of a body (for example, for a meandering course of a separator strip, where the portions of the electrodes situated between the adjoining electrodes represent plate-shaped separators), which has two (exterior) large surfaces that extend in a longitudinal direction and a width direction of the body, wherein a (maximum) height of the body that corresponds to the (maximum) spacing of the large surfaces is smaller (in particular at most 1/10 or 1/100 or 1/100) than the (maximum) length and smaller than the (maximum) width.

In a first determination step of the method, geometries (i.e., geometric data, in particular with regard to the shapes and dimensions) of at least one of the large surfaces of at least (all of) the anodes and/or (all of) the cathodes, optionally also of the separators, are determined. This preferably takes place in a separated state of the battery element layers.

Determining the geometries of at least the anodes and/or the cathodes may preferably be carried out based on the image of an optical camera system, i.e., by use of an image-generating system that is based on visible light, and that includes one or more cameras, which allows the first determination step to be carried out easily and cost-effectively. The image capture of a camera of the camera system may preferably be recorded in a top view, i.e., with a "view" of the large surfaces of the battery element layers, and particularly preferably with a perpendicular orientation of the optical axis of the camera of the camera system with respect to these large surfaces. This may likewise be advantageous with regard to carrying out the first determination step, since the largest possible large-surface portion of the battery elements may be detected.

The battery element layers can be stacked in a stacking step to form the stack. It may preferably be provided that the battery element layers are stacked in a defined order to form the stack, and/or that the order in which this takes place is determined and stored. The first determination step and the stacking step may preferably be carried out simultaneously, at least in part, in that, for example, each battery element layer that is placed on the stack that is being formed, or the next battery element layer to be placed, is used to determine the geometry of the large surface thereabove. However, it may also be provided that the stacking step is not carried out until after the first determination step.

For a position check of at least the anodes and/or the cathodes, provided that they have been geometrically measured in the first determination step, a plurality of method steps is subsequently carried out. If a position check is performed for the anodes and the cathodes, these method steps are each carried out separately for the anodes on the one hand and the cathodes on the other hand (but preferably simultaneously, at least at times).

In a second determination step, initially the stack is irradiated by X-ray radiation that is emitted by an X-ray emitter and detected by an X-ray detector, wherein the X-ray radiation (i.e., at least one beam, in particular the central beam thereof) is oriented perpendicularly with respect to the large surfaces of the battery element layers. A relative movement between the stack and the X-ray radiation is brought about, preferably by moving the stack with the X-ray emitter and X-ray detector stationary. This relative movement may preferably be linear. By means of the detected X-ray radiation, with regard to at least one pair of opposite sides of the stack the greatest edge spacing that is present between the edges of this pair is then determined. According to the invention, a spacing is in principle determined on the direct or shortest possible path.

In a first check step it is then checked whether this greatest edge spacing is less than a first tolerance value. In the negative case, i.e., when the greatest edge spacing is not less than and therefore is equal to or greater than the first tolerance value, the stack is assessed as unallowable. In contrast, in the positive case, i.e., when the greatest edge spacing is less than the first tolerance value, a second check step is carried out.

In this second check step it is checked whether the determined greatest edge spacing is less than a value that results from the sum of the shortest (geometric) dimension with regard to the determination direction (connection direction between the pair of the opposite sides of the stack) of all the particular electrodes (anodes or cathodes) on the one hand, and the difference between a second tolerance value and one-half the overhang on the other hand. The overhang is defined as one-half the value by which the greatest edge spacing is less than the first tolerance value. If this second check step gives a negative check result, i.e., the greatest edge spacing is not less than and therefore is equal to or greater than the value that results from the sum of the shortest dimension of all the particular electrodes on the one hand and the difference between a second tolerance value and one-half the overhang on the other hand, the stack is assessed as unallowable. In contrast, if the second check step gives a positive check result, i.e., the greatest edge spacing is less than the value that results from the sum of the shortest extension of all the particular electrodes on the one hand and the difference between a second tolerance value and one-half the overhang on the other hand, the stack is assessed as allowable. A stack that is assessed as allowable may be provided without limitation for use in manufacturing a battery.

The aim of the method according to the invention is to advantageously link the geometric data from the first determination step with the determination results from the second determination step, wherein the specific evaluation according to the check steps allows the positions of all anodes and/or cathodes to be checked. This is possible despite the relatively simple type of (perpendicular) irradiation of the stack with the X-ray radiation during the second determination step. Namely, as a result of this type of irradiation, the edges of all these particular electrodes cannot be exactly determined by evaluating the X-ray radiation measured by the X-ray detector. Rather, despite determining only the distance of the edges of the particular electrodes that are spaced the farthest apart from one another, which is formed by the selected pair of the sides of the stack, the linkage with the geometric data of all the particular electrodes (anodes and/or cathodes) and the specific evaluation according to the check steps ensure with relatively great accuracy that all of the electrodes in question have sufficient positional accuracy. This allows a relatively quick check of the stack, since the stack can be rapidly and easily moved through the X-ray radiation due to the perpendicular irradiation that is possible.

It may be provided that in the first determination step, the profiles of those edges or edge sections that form all corners of the particular electrodes, i.e., anodes or cathodes, can be determined. As a result, the complete geometry of the large surfaces of these particular electrodes would be determined. This may allow a sufficiently exact check result to be achieved for the entire stack, even if the first determination step is carried out only for a portion of the battery element layers, for example solely for the cathodes and/or anodes. However, in principle it may also be sufficient to determine in the first determination step the profiles of those edges or edge sections that form only a portion of the corners of the particular electrodes.

To achieve the most reliable check result possible for the stack, it may preferably be provided that the second determination step and the check steps following it are carried out for at least two or exactly two pairs of opposite sides of the stack. Based on the preferred configuration of the battery element layers with large square surfaces, as a result the determination and checking are carried out on the one hand for the particular combinations of the edges that border the greatest distance with regard to the lengths of the particular electrodes, and on the other hand for the greatest distance with regard to the widths of the particular electrodes. It is thus possible to perform a particularly accurate check with regard to the positions of the battery element layers relative to one another, which may still be implemented via only two simple linear relative movements between the stack and the X-ray radiation. The second determination step and the first and second check steps may be carried out in succession for the at least two or exactly two pairs, so that the stack is, for example, initially moved along a longitudinal direction of the stack relative to the X-ray radiation, and subsequently, after a rotation by 90°, for example, about the stacking direction, is moved along a width direction relative to the X-ray radiation. However, the edges of both pairs may also be simultaneously detected.

It may be provided that only type of electrode, in particular the cathode, can be checked according to the second determination step and according to the first and the second check steps. This may be due to the fact that for this type of electrode, because of the specific structural design, based on the images that can be determined by evaluating the X-ray radiation that is detected by the X-ray detector, the positions of all edges cannot be exactly or unambiguously determined, which may be attributed to relatively strongly pronounced absorption behavior for the X-ray radiation.

For the relative positions of the other type of electrode, in particular the anode, a simpler and/or more accurate type of evaluation may be provided. For this purpose, in a further determination step and check step of the method according to the invention, which may optionally be carried out as part of the second determination step or simultaneously with the second determination step, the stack may be irradiated by (the) X-ray radiation that is emitted by a/the X-ray emitter and detected by a/the X-ray detector, the X-ray radiation being oriented perpendicularly with respect to the large surfaces of the battery element layers, and by means of the detected X-ray radiation, with regard to at least one side of the stack, the greatest edge spacing that is present between the edges of all electrodes of this type that are associated with this side of the stack, being determined and checked for whether this edge spacing is less than a third tolerance value. If a negative result is obtained, i.e., the greatest edge spacing is not less than, but instead is equal to or greater than the third tolerance value, the stack is assessed as unallowable or as a reject. A stack assessed as a reject may in particular be regarded as conclusively unsuitable for further use in the manufacture of a battery. In contrast, for a positive result, the stack is assessed as allowable. The further determination step and check step are preferably carried out for all sides of the stack, but at least for those sides of the stack that border at least two of the edges of the stack extending in the stacking direction, in order to achieve the most accurate check result possible.

The procedure according to the second determination step and the first and second check steps is based on a simplification of the determination result. This simplification is based on the fact that for the assessment it is always assumed that the smallest of all particular electrodes, with regard to the dimension between the edges of a pair, sets one of the edges that determines the greatest edge spacing of this pair. The smallest electrode has been determined within the scope of the first determination step. This may result in an assessment of the stack as unallowable, when in fact this is not the case, because the smallest of the electrodes does not set one of the edges that defines the greatest edge spacing. Accordingly, the simplification is selected in such a way that there is a certain inaccuracy only with regard to an assessment of the stack as unallowable.

Accordingly, it may be advantageous to recheck a stack which, in particular in the second determination step and the first and second check steps, but possibly also in the further determination step and check step, was assessed as unallowable. For this purpose it may preferably be provided that in a third check step, provided that the stack has been assessed as unallowable, the stack is additionally checked for compliance with at least one tolerance range, wherein in the negative case the stack is assessed as a reject, and in the positive case the stack is assessed as allowable.

In the third check step the stack may preferably be irradiated by X-ray radiation that is emitted by an X-ray emitter and detected by an X-ray detector, wherein the orientation of the stack relative to the X-ray radiation is selected in such a way that at least one edge of the stack extending along the stacking direction is completely captured in at least two different positions in the space covered by the X-ray radiation, and on this basis the relative positions of the corners, forming this edge of the stack (or of the edge sections adjoining these corners), of the battery element layers are determined. This procedure may resemble or correspond to that for conventional computer tomography.

It may be provided that during the stacking or after the stacking of the battery element layers within the scope of the stacking step, the battery element layers are checked for the presence of a bend, since such a bend could falsify the result with regard to the checking of the stack. A bend is understood to mean an angled course, in particular a course of the large surface of a battery element layer that is angled by at least 45° or at least 90°. The angle of this course may also be approximately 0°/360°, as a result of which two sections of this battery element layer extend approximately in parallel. Such a check may also be carried out simultaneously with the first determination step, and in particular may also be integrated into the first determination step by using the same device (in particular an optical camera system).

The bend check may preferably be carried out by determining and evaluating geometries of the battery element layers and/or by determining and evaluating the geometry of the stack.

The determining of the geometries of the battery element layers within the scope of the bend check and/or the determining of the geometry of the stack may likewise be advantageously carried out by use of an optical camera system. The image of the camera system may preferably be recorded in a top view with regard to the large surfaces of the battery element layers. Such an orientation of the camera system with respect to the battery element layers may be provided in particular when the geometries of the individual battery element layers are in each case determined after the placement or during the placement on the stack to be formed. Alternatively. it may be provided that for determining the geometries of the battery element layers in the formed stack, the image of the camera system is recorded in a side view with regard to the stack.

A determination of the geometry of the stack may in particular encompass determining the heights of the stack, i.e., the extensions of the stack along the stacking direction, at multiple locations, which may also take place mechanically in a relatively simple and cost-effective manner.

The battery elements utilized within the scope of a method according to the invention may preferably be designed in such a way that in each case the large surfaces of the anodes are greater than the large surfaces of the cathodes, and/or the large surfaces of the separators are greater than the large surfaces of the cathodes, and are preferably also greater than the large surfaces of the anodes. Due to the different sizes of the large surfaces of the various battery element layers, the intent in each case is to achieve an all-around overhang of the relatively large battery element layers (separator and anode) with respect to the next smaller battery element layer in each case. It may thus be possible to advantageously carry out in particular the second determination step and the optionally provided further determination step and check step, which may be based on the different absorption behaviors of these various battery element layers for X-ray radiation. These different absorption behaviors may be due to the different materials from which the various battery element layers are made. The absorption behavior of the cathodes may be the highest, and that of the separators may be the lowest.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
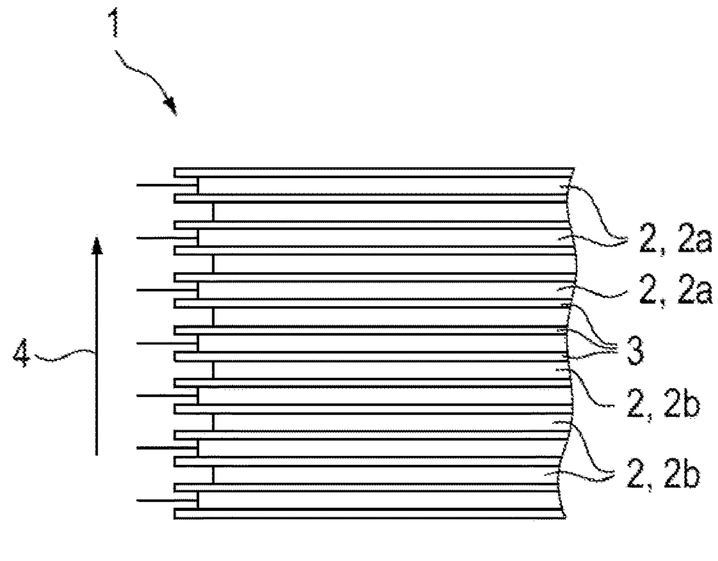
FIG. 1 shows a cross section of a portion of a stack made up of battery element layers in the form of anodes, cathodes, and separators.

Within the scope of battery cell manufacture, stacks 1, which along a stacking direction 4 include, in alternating order, battery element layers in the form of plate-shaped electrodes 2 and electrically insulating plate-shaped separators 3, may be produced. The electrodes 2 are situated in the stack 1, once again in alternation, in configurations and arrangements that correspond to intended uses as anodes 2*a* and cathodes 2*b*. The electrodes 2 and the separators 3 have large rectangular surfaces, wherein the large surfaces of the anodes 2*a*, of the cathodes 2*b*, and of the separators 3 have different sizes in order to avoid a short circuit between neighboring anodes 2*a* and cathodes 2*b* as well as excessively large losses with regard to the electrical performance of the battery to be manufactured, despite inaccuracies in the stacking, which are at least still within appropriate tolerance ranges. According to FIG. 1, it may be provided that the cathodes 2*b* have the smallest large surfaces and the separators 3 have the greatest large surfaces, resulting in a complete (i.e., with regard to the widths as well as the lengths of the battery element layers in the present case) overhang, on the edge side, of the anodes 2*a* with respect to the cathodes 2*b* on the one hand, and of the separators 3 with respect to the anodes 2*a* (and thus also with respect to the cathodes 2*b*) on the other hand.

The plate-shaped separators 3 may, at least in part, also be sections of a meandering separator strip. In addition, the protruding edge regions of neighboring separators 3 may be adhesively bonded.

Figure 2:
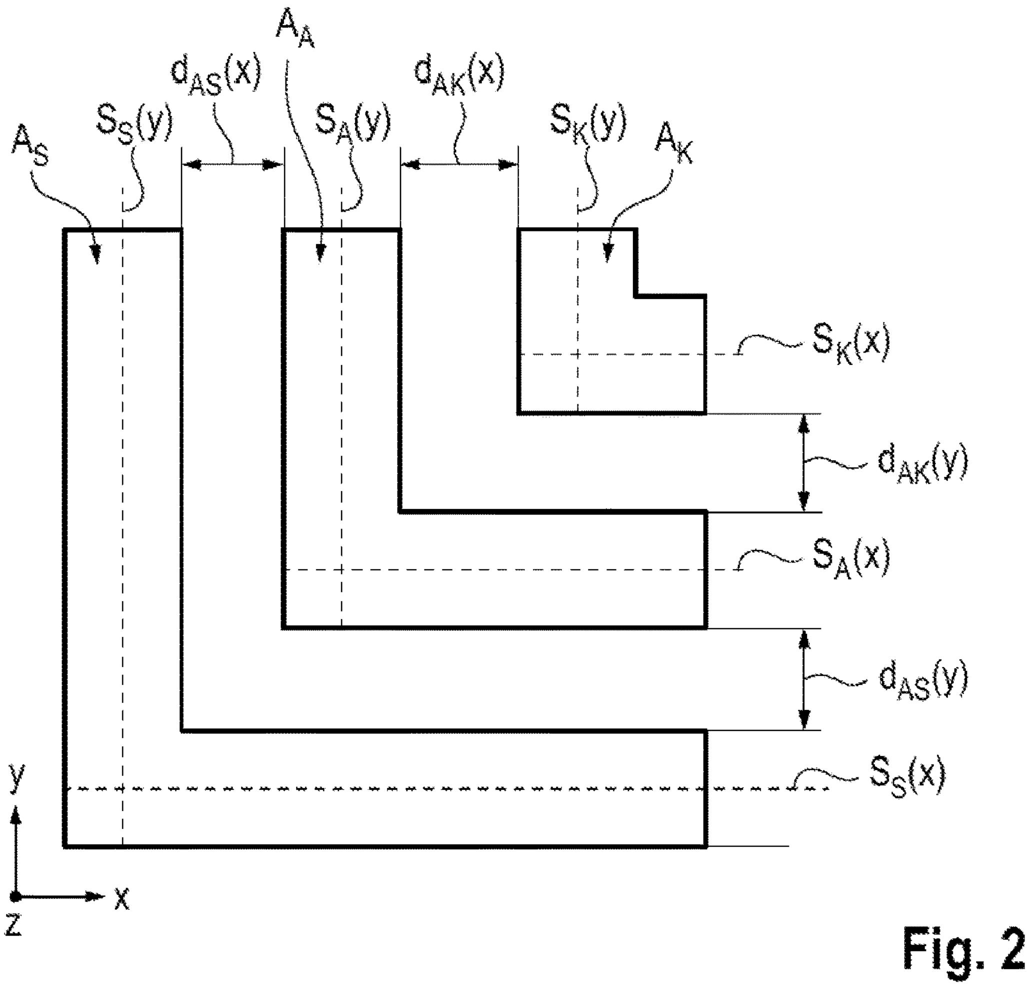
FIG. 2 shows placement areas for the cathodes, anodes, and separators of the stack.

FIG. 2 shows possible specifications for sufficiently precise stacking of the battery element layers for one of the total of four edges of the stack 1 extending along the stacking direction 4, wherein these specifications are to be met for all of these edges. Accordingly, a placement area $A_A$, $A_K$, $A_S$ may be provided for all of the anodes 2*a*, the cathodes 2*b*, and the separators 3, respectively, within which the edges of these various types of battery element layers are to be situated. In addition, the optimal position $S_A$, $S_K$, $S_S$ is illustrated with regard to the particular width and length for each of the various types of battery element layers, this optimal position $S_A$, $S_K$, $S_S$ extending centrally within the respective placement area $A_A$, $A_K$, $A_S$. The widths of the placement areas $A_A$, $A_K$, $A_S$ may each be, for example, 1.0 mm or +0.5 mm on both sides of the respective optimal position $S_A$, $S_K$, $S_S$. In addition to the various placement areas $A_A$, $A_K$, $A_S$ for the different types of battery element layers of all battery elements of a stack 1, a minimum distance $d_{AK}$, $d_{AS}$ between the various placement areas $A_A$, $A_K$, $A_S$ may also be provided as a specification for sufficiently precise stacking. The minimum distance $d_{AK}$ between the placement area $A_A$ for the anodes 2*a* and the placement area $A_K$ for the cathodes 2*b* as well as the minimum distance $d_{AS}$ between the placement area $A_A$ for the anodes 2*a* and the placement area $A_S$ for the separators 3 may in each case be 0.8 mm, for example. Over the chain encompassed by these two minimum distances $d_{AK}$, $d_{AS}$ as well as the width of the placement area $A_A$ for the anodes 2*a*, this also results in a minimum distance between the placement area $A_K$ for the cathodes 2*b* and the placement area $A_S$ for the separators 3.

Due to a combination of multiple determination steps and check steps, the method according to the invention allows the simplest and fastest checking possible of the stack 1 with regard to sufficiently precise positions of at least the electrodes 2 of the stack 1.

Figure 3:
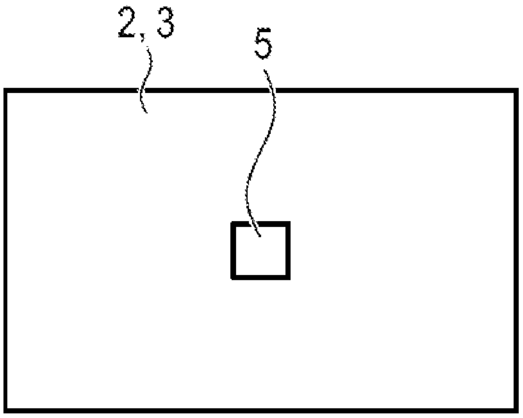
FIG. 3 shows a separated battery element layer of the stack and a camera system according to a first variant for use in the first determination step of a method according to the invention.

In a first determination step of the method, geometries of each of the large surfaces of all battery element layers are determined. This takes place using an optical camera system in a top view (see FIGS. 3 and 4), by means of which at least one image of the separated battery element layers may be recorded and evaluated in each case. A first light source (not illustrated) may preferably be situated on the same side, with regard to the separated battery element layers, as at least one camera 5 of the camera system, and a second light source (not illustrated) may be situated on the opposite side with regard to the separated battery element layers.

Figure 4:
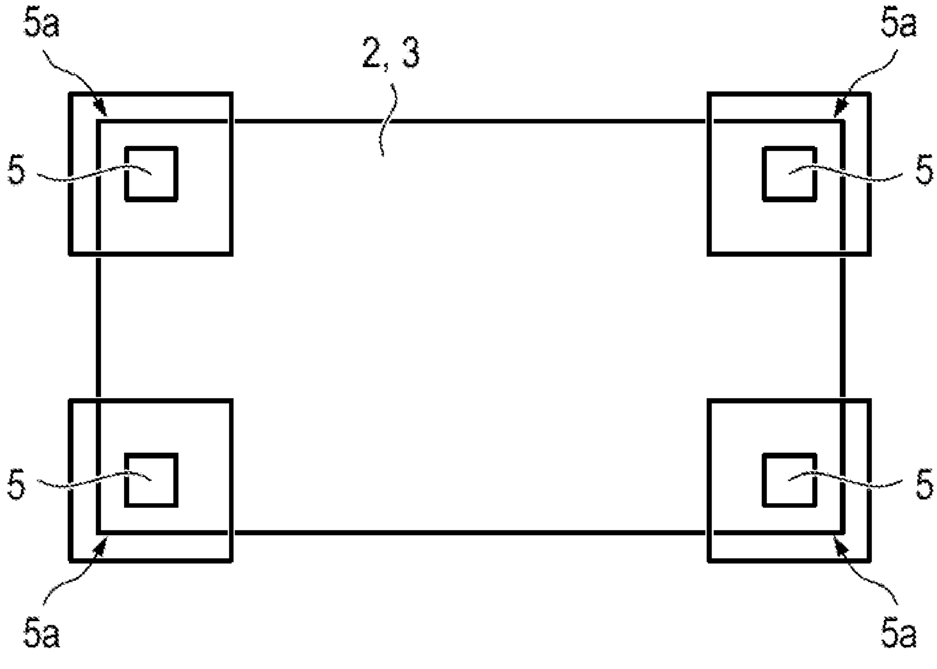
FIG. 4 shows a separated battery element layer of the stack and a camera system according to a second variant for use in the first determination step of a method according to the invention.

If the detection range 5*a* of the at least one camera 5 used is large enough, the separated battery element layers may be completely detected, even without relative movement with respect to this camera 5. However, to achieve a relatively high resolution it may also be provided to move the separated battery element layers and the at least one camera 5 relative to one another, wherein the at least one camera 5 in each case detects only portions of the battery element layers. A relatively high resolution without relative movement may be achieved by use of multiple cameras 5, which then may each have a detection range 5*a* that is smaller than the large surfaces of the battery element layers. In this regard, FIG. 4 shows an example in which in each case a camera 4 is associated with each of the four corners of the separated battery element layers.

Preferably at the same time as or after the geometries of the separated battery element layers are determined in the first determination step, in a stacking step of the method the battery element layers are stacked in a defined number and optionally also in a reproduced order to form the stack 1.

During the stacking or after the stacking of the battery element layers, they are also checked for the presence of a bend. This may likewise take place using a camera system. This may preferably be the same camera system that is used for the first determination step. However, this may also be a different camera system. Different camera systems may be meaningfully used, for example, when scope of a serial check of multiple stacks, these multiple stacks are simultaneously subjected to different determination steps and check steps which proceed in sequence with regard to the individual stacks.

FIGS. 5 through 8 show various options for carrying out a bend check. A camera system is used in each case for a bend check according to FIGS. 5 and 6.

Figure 5:
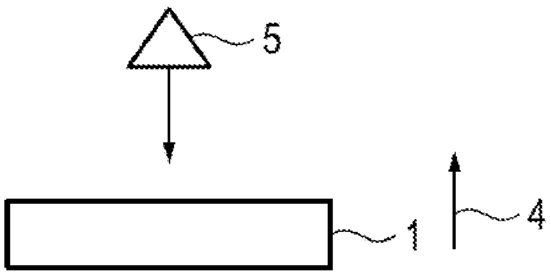
FIG. 5 shows the stack and a camera system according to a first variant for use in a bend check of a method according to the invention.

In the camera system according to FIG. 5, the camera 5 is positioned for recording images in a top view of the large surfaces of the battery element layers. By use of the camera, it is possible, similarly as for the procedure according to the first determination step, to determine the geometries of the large surface of the battery element layers of the stack 1 (to be formed) and to check the presence of a bend. A comparison may advantageously be made to the geometric data, previously determined in the first determination step, for the particular battery element layers. However, this is not absolutely necessary, since a bend in a battery element layer typically results in such a large geometric deviation that even a bend check on a comparison of the determined geometry to a reference geometry that is defined for all battery element layers of one type may be sufficient. Since it is not possible to completely detect the geometries of all battery element layers of a stack 1 when the images are recorded in a top view, it is provided to sequentially carry out the bend check using a camera system according to FIG. 5 for the individual battery element layers during the stacking; i.e., for the particular battery element layers which during the stacking are placed on the stack 1 that is being formed, in each case at least one image is detected by means of the camera 5 before another battery element layer is placed on the stack 1.

Figure 6:
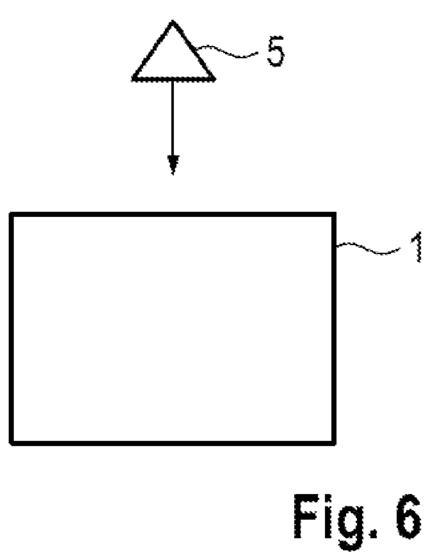
FIG. 6 shows the stack and a camera system according to a second variant for use in a bend check of a method according to the invention.

In contrast, for the camera system according to FIG. 6 the camera 5 is arranged for recording images in a side view with regard to the stack 1. In this way, the profiles of all battery element layers may be determined in the corresponding side view, and at the same time the presence of a bend may be checked. For the most complete bend check possible, images from at least two opposite sides of the stack 1 should be created and evaluated, for which reason the camera system may include at least two cameras 5. Alternatively, however, a relative rotation between the stack 1 and the camera system may be provided in such a way that multiple sides of the stack are detected in succession via the image of a single camera 5. Since all the battery element layers may be simultaneously checked for the presence of a bend using the camera system according to FIG. 6, a corresponding bend check may advantageously be carried out on the completely formed stack 1.

Figure 7:
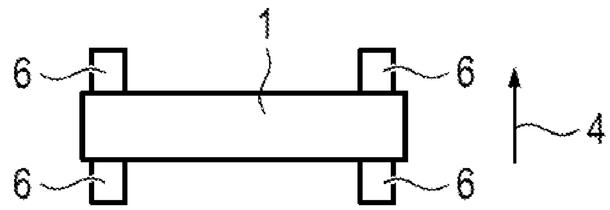
FIG. 7 shows a side view of the stack and a mechanical measuring system for use in a bend check of a method according to the invention.
Figure 8:
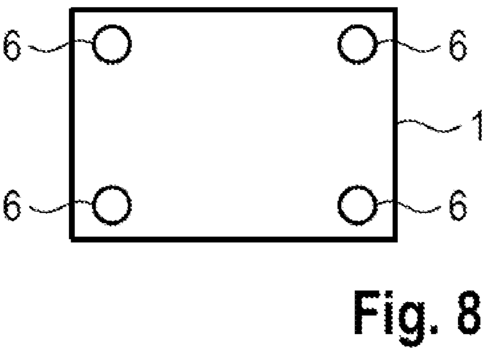
FIG. 8 shows the stack and the measuring system according to FIG. 7 in a top view.

The bend check according to FIGS. 7 and 8 is based on a determination of the particular height of the stack 1 at multiple measuring points. This may take place, for example, mechanically using a measuring probe 6. It is advantageous for at least one measuring point to be associated in each case with each of the edges of the stack 1 extending along the stacking direction 4 or to be situated in the vicinity of this edge, since in particular the corners of the battery element layers that form these edges are exposed to the risk of bending during stacking.

Figure 9:
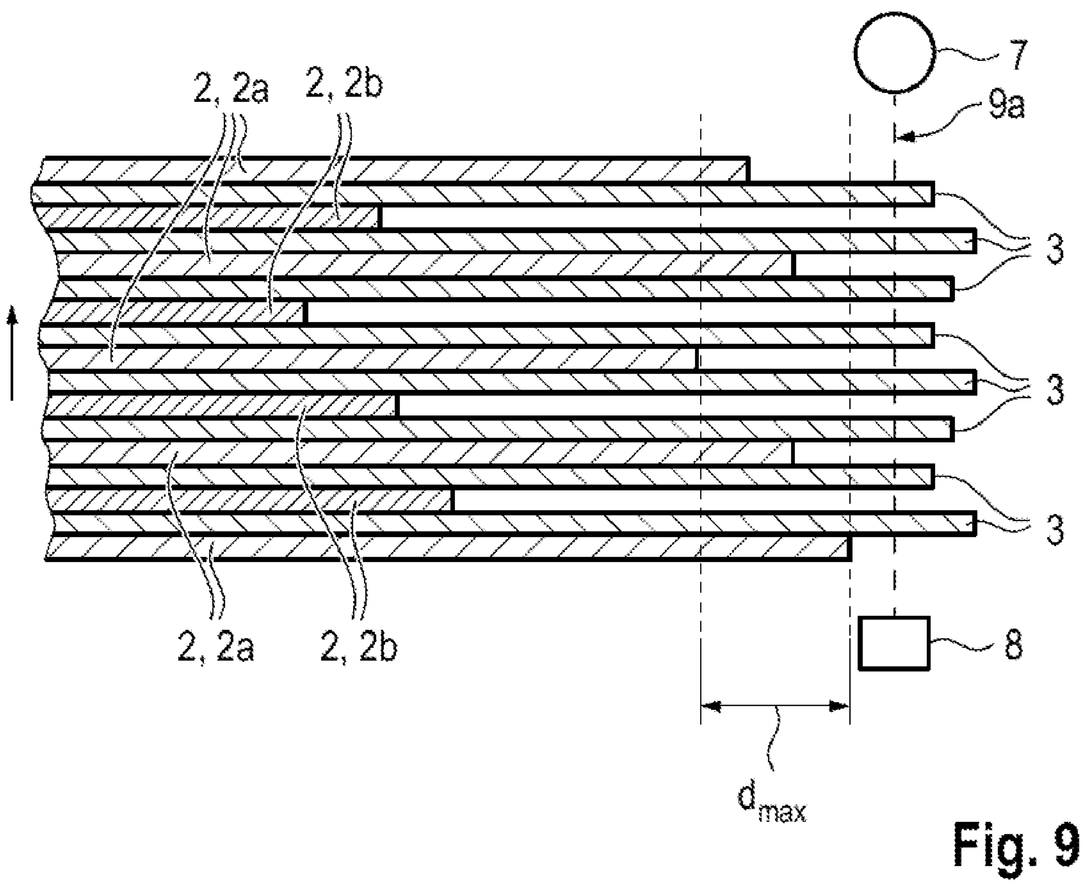
FIG. 9 shows the stack and an X-ray system for use in the second determination step of a method according to the invention.
Figure 10:
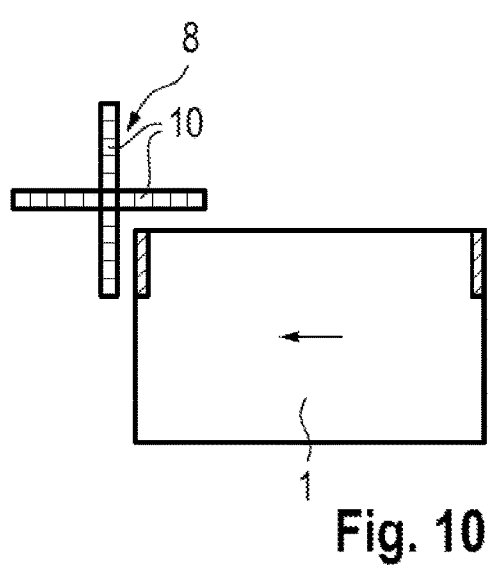
FIGS. 10 to 14 show various positions of the stack relative to an X-ray detector of an X-ray system.
Figure 11:
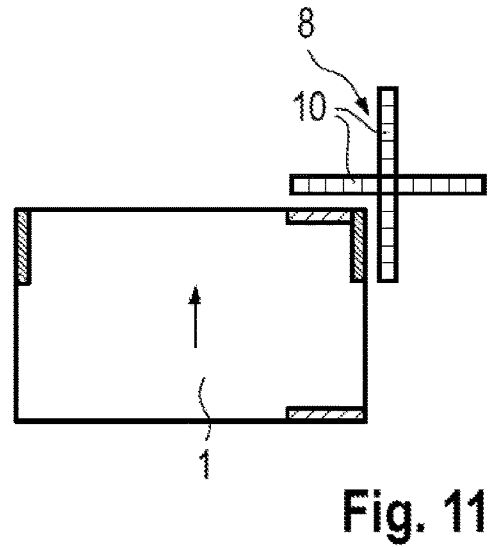
Figure 12:
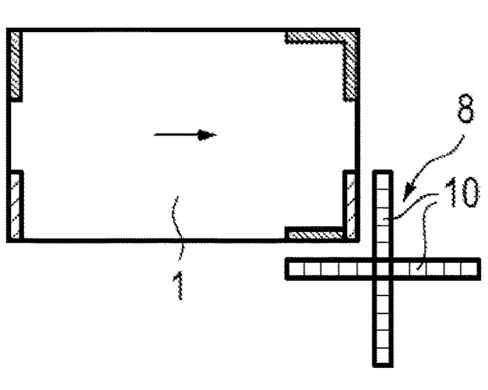
Figure 13:
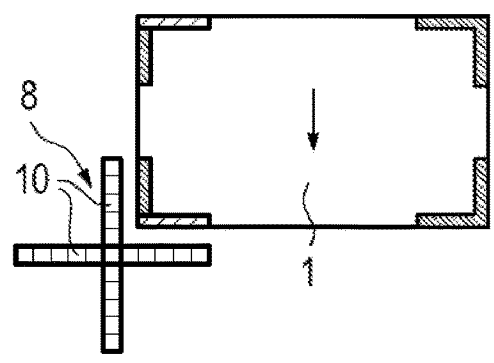
Figure 14:
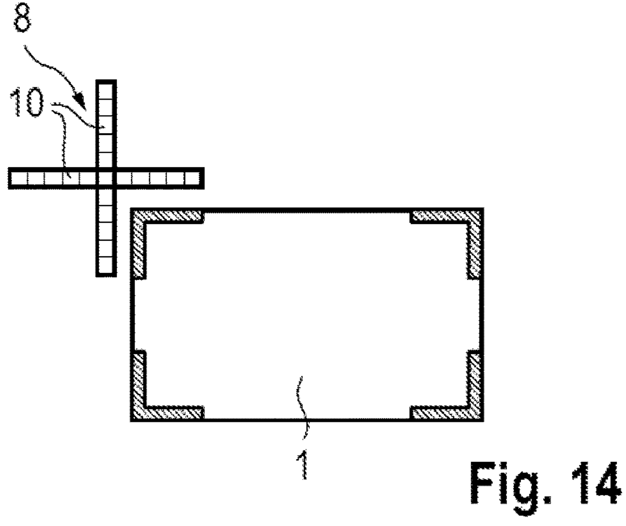

A second determination step is carried out following the stacking step with the bend check. In the second determination step, the stack 1 is irradiated by X-ray radiation 9 that is emitted by an X-ray emitter 7 and detected by an X-ray detector 8 (see FIG. 9). It is provided that the X-ray radiation 9 is oriented perpendicularly with respect to the large surfaces of the battery element layers, wherein the perpendicular orientation relates to a central beam 9*a* of the X-ray radiation 9 which spreads out conically from the X-ray emitter 7.

To the extent possible, the positions of edges of at least the anodes 2*a* and the cathodes 2*b* are determined by evaluating the X-ray radiation that is detected by the X-ray detector 8.

Since on the one hand the anodes 2*a* are larger than the cathodes 2*b*, and on the other hand the anodes bring about only average absorption of the X-ray radiation, it is possible to determine the positions of all the edges of the anodes 2*a* based on the X-ray radiation that is detected by the X-ray detector 8, since for these edges there is sufficient contrast in the corresponding images. The very slight absorption of the X-ray radiation by the separators 3, whose large surfaces are even greater than those of the anodes 2*a*, does not significantly hinder this evaluation.

For a position check of the anodes 2*a*, based on the determined positions of the edges of the anodes 2*a* according to a further determination step and check step of the method, the respective greatest distance $d_{max}$ (see FIG. 9) that is present between those edges of all anodes 2*a* that form the individual sides of the stack 1 is determined, and it is also checked whether this greatest distance $d_{max}$ in each case is less than a (third) tolerance value. This (third) tolerance value may also be different for the various sides of the stack 1. If this requirement is met in each case, the stack 1 is assessed as allowable. If this is not the case, the stack 1 is assessed as unallowable or as a reject.

Figure 15:
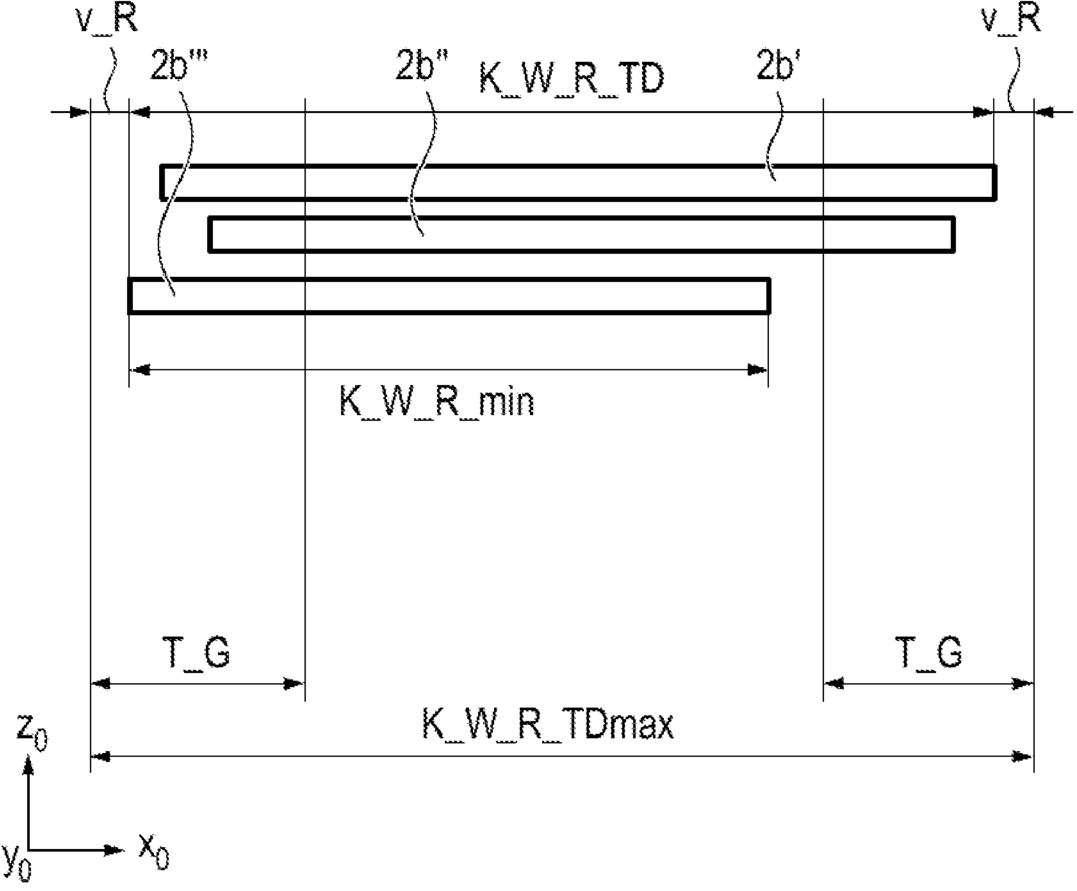
FIG. 15 shows an illustration of dimensions for the cathodes of the stack.

For the cathodes 2*b*, a position check as provided for the anodes 2*a* is not easily possible, since the positions of edges that are covered by other cathodes 2*b* are not, or are not clearly, identifiable due to the relatively strong absorption of the X-ray radiation by the cathodes 2*b*. This applies in particular to an edge of one of the cathodes 2*b* that is overlaid by all other cathodes 2*b* regarding the orientation with respect to the X-ray emitter 7. The method therefore provides, in the second determination step, to determine in each case the greatest edge spacing (K_W_R_TD) that is present between all edges of the cathodes 2*b* of the individual pairs, based on the detected X-ray radiation for both pairs of opposite sides of the stack 1. This is illustrated in FIG. 15. If the anodes 2*a* are designed in such a way that the position check for these anodes cannot be performed, the method described for the cathodes 2*b* may also be advantageously used for the anodes 2*a*.

For simplification, only three cathodes 2*b* of the stack 1 are illustrated in FIG. 15. A first cathode 2*b*' of the stack has the largest dimension (length or width) with regard to the extension of the stack 1 between the sides of a specific pair. With regard to this dimension, this first cathode 2*b*' may be larger than a second cathode 2*b*", which in this respect may correspond to a defined nominal dimension. In contrast, a third cathode 2*b*'" is the smallest (of all cathodes 3*b* of the stack) with regard to the dimension under consideration. Due to at least partial coverage of the edges of the second cathode 2*b*" and of the third cathode 2*b*" by the first cathode 2*b*', for the X-ray radiation an unambiguous determination of these covered edges may be prevented. For this reason, the second determination step and the first and second check steps that follow it are based on a simplification of the determination result. However, this simplification is selected in such a way that an inaccuracy exists only with regard to an assessment of the stack 1 as unallowable, so that stacks assessed as allowable always meet all requirements with regard to the positional accuracy of at least the electrodes 2.

For this purpose, in a first check step it is checked whether the greatest edge spacing (K_W_R_TD), which is present between the edges of the cathodes 2*b* of a specific pair of sides of the stack 1, is less than a first tolerance value (K_W_R_TDmax), wherein in the negative case (K_W_R_TD≥K_W_R_TDmax) the stack 1 is assessed as unallowable, and in the positive case (K_W_R_TD<K_W_R_TDmax) a second check step is carried out.

In the second check step it is checked whether the greatest edge spacing (K_W_R_TD) is less than a value that results from the sum of the shortest dimension (length or width) of all cathodes of the stack with regard to the determination direction (K_W_R_min) on the one hand, and the difference between a second tolerance value (T_G) and one-half the overhang (v_R) on the other hand. The overhang (v_R) is defined as one-half the value by which the greatest edge spacing (K_W_R_TD) is less than the first tolerance value (K_W_R_TDmax). The second tolerance value (T_G) may correspond to a maximum length deviation (in the direction of the extension between the sides of the pair in question), which for the edges of the cathodes 2*b* has been defined as allowable. If this second check step gives a negative check result (K_W_R_TD≥(T_G−v_R)+K_W_R_min), the stack is assessed as unallowable. In contrast, if the second check step gives a positive check result (K_W_R_TD<(T_G−v_R)+K_W_R_min), the stack is assessed as allowable.

For determining the positions of the edges within the scope of the second determination step and the further determination step and check step, it is not necessary to detect them with the X-ray radiation over their entire length. Instead, in each case two different sections of the edges may be determined in succession (see FIGS. 10 through 14), and these partial results may be linked to determine an individual edge profile. For this purpose, the stack 1, for example according to FIGS. 10 through 14, may be moved in a targeted manner through linear detection ranges of two line detectors 10, which in combination represent the X-ray detector 8. In FIGS. 10 through 14, such edge sections that are not yet detected in the particular detection step are depicted by crosshatching to the right, and edge sections that have already been detected are depicted by crosshatching to the left. A planar detection range is obtained due to the movement of the battery element stack 1 through the detection ranges of the line detectors 10. This also allows simultaneous detection of the edges that are associated with both pairs of opposite sides of the stack 1. In the example according to FIGS. 10 through 14, the line detectors 10 are arranged perpendicularly to one another and in the shape of a cross. Other configurations, for example in an L shape, are likewise possible. The movement of the stack 1 is in each case oriented perpendicularly with respect to the detection range of one of the line detectors 10.

Figure 16:
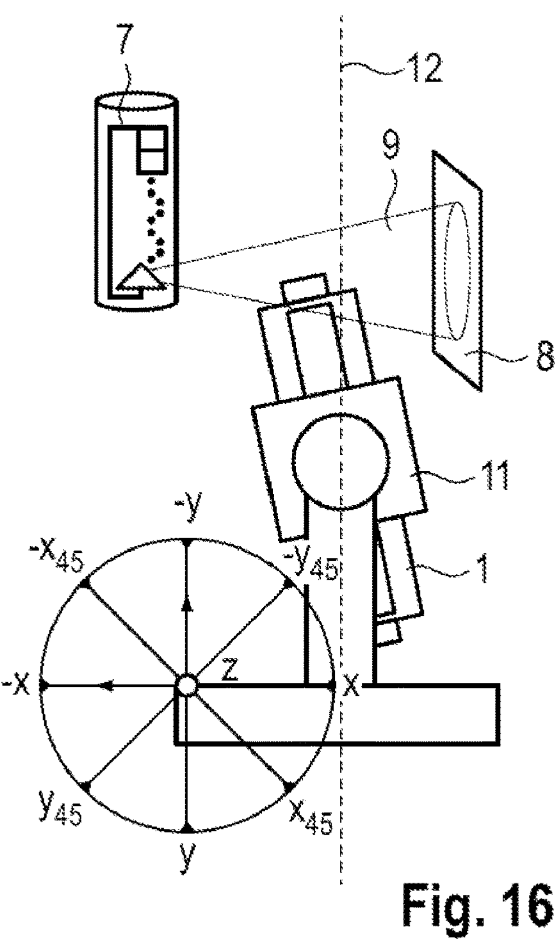
FIG. 16 shows the stack and an X-ray system for use in a third check step of a method according to the invention.
Figure 17:
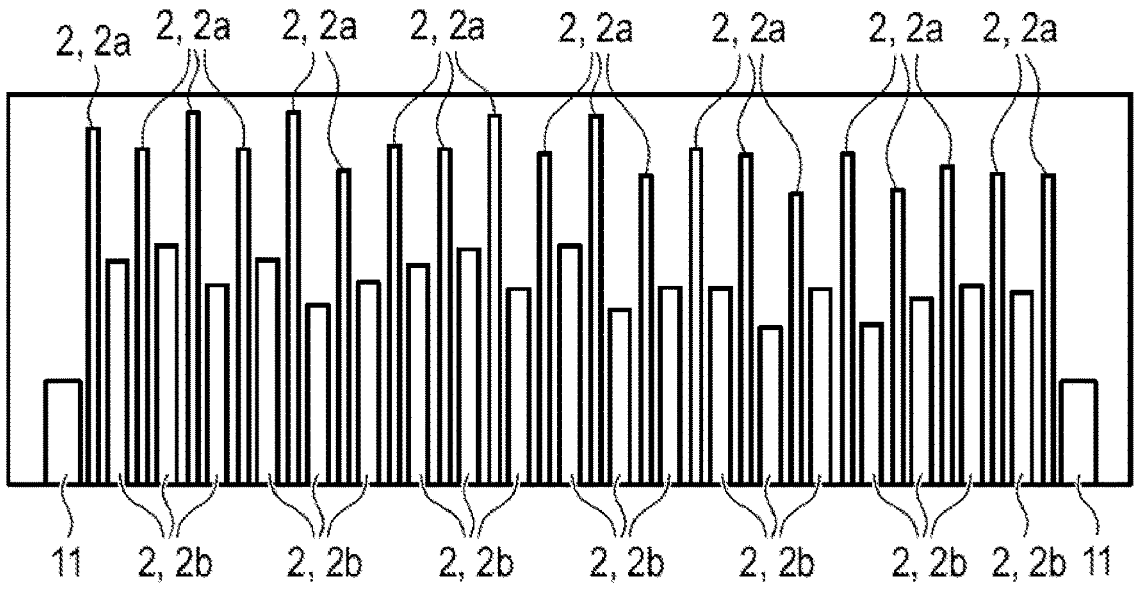
FIG. 17 shows an image of a portion of the stack, created using the X-ray system according to FIG. 16.

Due to the simplification of the determination result of the second determination step, for a stack 1 that has been assessed as unallowable in the second determination step and the associated first and second check steps, it is provided to additionally check this stack in a third check step, wherein in this regard a more complex examination in the manner of computer tomography is carried out. For this purpose, the stack 1 according to FIG. 16 is fixed in a workpiece carrier 11 and positioned in the range of X-ray radiation 9 in such a way that at least one edge of the stack 1 extending along the stacking direction 4 is detected. Shadowing of the X-ray radiation 9 by this edge is determined in a number of positions of the stack by rotating the stack 1 about a rotational axis 12, and on this basis the relative positions of the corners of the battery element layers that form this edge of the stack 1 are determined. In this regard, FIG. 17 shows an example image that has been generated based on the detected X-ray radiation 9 from one section of the stack 1 that includes the edge in question.

This third check step is preferably carried out for at least two of the edges of the stack 1, wherein for only two checked edges, these edges should be situated diagonally with respect to one another in the stack 1.

Based on the positions of the edges determined in the third check step, it is further checked whether these edges are in a defined tolerance range, wherein in the negative case the stack 1 is assessed as a reject, and in the positive case the stack 1 is assessed as allowable. The third check step is thus used to verify whether a stack 1, which in the second determination step and the associated first and second check steps has been determined to be unallowable and thus potentially unsuitable for use in manufacturing a battery, is in fact unsuitable and therefore is a reject, or whether it has been classified as unallowable only because of the simplification on which the first and second check steps are based. Such a classification may then be revised via the third check step, so that the situation is prevented that stacks 1 that are suitable for manufacturing batteries are handled as a reject.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for checking a stack of multiple battery element layers, each battery element layer comprising: of an anode as a first type of electrode, a cathode as a second type of electrode, and a separator, the anode and cathode battery element layers each having a polygonal surface area, and are stacked along a stacking direction that is oriented substantially perpendicularly with respect to the polygonal surface area to make the stack of multiple battery element layers, the method comprising:

- determining, a geometry of the polygonal surface area of at least one of the anodes and the battery element layer in a first determination step;
- stacking the battery element layers in a stacking step to form the stack of multiple battery element layers and subsequently for a position check of at least one of a pair of anode battery layers and/or of a pair of cathodes battery layers stacked in the stack of multiple battery element layers;
- irradiating, in a second determination step, the stack of multiple battery element layers by X-ray radiation that is emitted by an X-ray emitter and detected by an X-ray detector, the X-ray radiation being oriented substantially perpendicularly with respect to the polygonal surface areas of the multiple battery element layers;
- determining, via the detected X-ray radiation, with regard to at least one pair of opposite sides of the stack of multiple battery element layers, the greatest edge spacing that is present between edges of at least one of the pair of anode battery layers and the pair of cathode battery layers;
- checking, in a first check step, whether this greatest edge spacing is less than a first tolerance value, wherein when the greatest edge spacing is not less than the first tolerance value, the stack of multiple battery element layers is assessed as unallowable and when the greatest edge spacing is less than the first tolerance value, a second check step is carried out, wherein in the second check step one-half the value by which the greatest edge spacing is less than the first tolerance value is defined as the overhang; and checking whether the greatest edge spacing is less than a value that results from the sum of the shortest dimension with regard to the determination direction of all electrodes of at least one of the anode battery layers and the cathode battery layers and the difference between a second tolerance value and one-half the overhang, wherein when the greatest edge spacing is not less than the value, the stack of multiple battery element layers is assessed as unallowable and when the greatest edge spacing is less than the value, the stack of multiple battery element layers is assessed as allowable.

2. The method according to claim 1, wherein positions of the edges that form all corners or only a portion of the corners of the electrodes of the at least one of the anode battery layers and the cathode battery layers are determined in the first determination step.

3. The method according to claim 1, wherein the second determination step and the first and second check steps are carried out for at least two pairs of opposite sides of the stack of multiple battery element layers.

4. The method according to claim 1, wherein only one type of electrode is checked according to the second determination step and the first and second check steps, and in a further determination step and check step the stack of multiple battery element layers is irradiated by X-ray radiation that is emitted by the X-ray emitter and detected by the X-ray detector, wherein the X-ray radiation is oriented substantially perpendicularly with respect to the polygonal surface area of the battery element layers, wherein, via the detected X-ray radiation, with regard to at least one side of the stack of multiple battery element layers, the greatest distance that is present between the edges of all electrodes of the other type that are associated with this the at least one side of the stack of multiple battery element layers are determined and checked for whether the greatest distance is in each case less than a third tolerance value, and wherein if third tolerance value is more than the greatest distance the stack of multiple battery element layers is assessed as unallowable or as a reject and if third tolerance value is less than the greatest distance the stack is assessed as allowable.

5. The method according to claim 1, wherein, in a third check step, provided that the stack of multiple battery element layers has been assessed as unallowable, the stack of multiple battery element layers is additionally checked for compliance with at least one tolerance range, and wherein in the negative case the stack is assessed as a reject and in the positive case the stack is assessed as allowable.

6. The method according to claim 5, wherein in the third check step the stack of multiple battery element layers is irradiated by X-ray radiation that is emitted by the X-ray emitter and detected by the X-ray detector, wherein the orientation of the stack of multiple battery element layers relative to the X-ray radiation is selected such that at least one edge of the stack of multiple battery element layers extending along the stacking direction is captured in at least two different positions by the X-ray radiation, and wherein relative positions of the corners of the electrodes of the at least one of the anode battery layers and the cathode battery layers, forming the at least one edge of the stack of multiple battery element layers, are determined.

7. The method according to claim 1, wherein after the battery element layers are stacked in the stacking step, the stack of multiple battery element layers is checked for the presence of a bend.

8. The method according to claim 7, wherein the bend check is carried out by determining and evaluating geometries of each battery element layer of the stack of multiple battery element layers and/or by determining and evaluating the geometry of the stack of multiple battery element layers.

9. The method according to claim 1, wherein the geometries of each battery element layer of the battery element layers and/or the geometry of the stack of multiple battery element layers are determined using an optical camera system.

10. The method according to claim 9, wherein an image of the camera system is recorded in a top view with regard to the polygonal surface area of the battery element layers.

11. The method according to claim 8, wherein the geometries of the each battery element layer of battery element layers are determined in each case after the placement on the stack of multiple battery element layers that is being formed.

12. The method according to claim 8, wherein, for determining the geometries of each battery element layer of the battery element layers in the formed stack of multiple battery element layers, the image of the camera system is recorded in a side view with regard to the stack.

13. The method according to claim 8, wherein the determination of the geometry of the stack of multiple battery element layers comprises determining heights of the stack of multiple battery element layers at multiple locations.

14. The method according to claim 13, wherein the determination of the heights is mechanical.

15. The method according to claim 1, wherein the geometries of the stack of multiple battery element layers in the first determination step are determined while the each battery element layer of the battery element layers are in a separated in an unstacked state.

16. The method according to claim 9, wherein the geometries of the stack of multiple battery element layers are determined using the optical camera system arranged with an optical axis oriented substantially perpendicular to the polygonal surface area of the battery element layers.

* * * * *